(12) United States Patent
Yanase et al.

(10) Patent No.: US 9,120,167 B2
(45) Date of Patent: Sep. 1, 2015

(54) METHOD FOR MANUFACTURING SCREW-SHAPED TOOL

(75) Inventors: Yoshikoto Yanase, Tokyo (JP); Masashi Ochi, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 0 days.

(21) Appl. No.: 14/123,086

(22) PCT Filed: Feb. 17, 2012

(86) PCT No.: PCT/JP2012/053748
§ 371 (c)(1),
(2), (4) Date: Feb. 11, 2014

(87) PCT Pub. No.: WO2013/008484
PCT Pub. Date: Jan. 17, 2013

(65) Prior Publication Data
US 2014/0199921 A1 Jul. 17, 2014

(30) Foreign Application Priority Data

Jul. 12, 2011 (JP) ................................ 2011-153429

(51) Int. Cl.
*B24B 53/07* (2006.01)
*B23F 21/02* (2006.01)
*B23F 13/00* (2006.01)

(52) U.S. Cl.
CPC ............... *B23F 21/02* (2013.01); *B23F 13/006* (2013.01)

(58) Field of Classification Search
CPC ........ B24B 53/07; B24B 53/12; B24B 37/04; B24B 57/02; B24B 37/042
USPC ............................................ 451/56, 5, 21, 47
See application file for complete search history.

(56) References Cited

U.S. PATENT DOCUMENTS 1,676,371 A * 7/1928 Wildhaber ...................... 409/26
1,797,461 A * 3/1931 Wildhaber ...................... 409/12
(Continued)

FOREIGN PATENT DOCUMENTS

CN 101808771 A 8/2010
CN 101862867 A 10/2010
(Continued)

OTHER PUBLICATIONS

Hiroshi Gunbara, Kazumasa Kawasaki, "Geometrical Design of Point-Contact Face Gear", Transactions of the Japan Society of Mechanical Engineers, Part C, vol. 74, Issue 745, No. 08-0151, p. 197-201.

(Continued)

*Primary Examiner* — George Nguyen
(74) *Attorney, Agent, or Firm* — Birch, Stewart, Kolasch & Birch, LLP

(57) ABSTRACT

A method for manufacturing a screw-shaped tool for grinding a face gear with high precision. The tool is formed in such a manner that the diameter thereof gradually increases from an axial end to an intermediate section in the axial direction, and is used for cutting a face gear. The method includes setting up, on the basis of a prescribed pinion which is to mesh with the face gear to be machined, a virtual gear that is to mesh with the prescribed pinion, and has a greater number of teeth than the prescribed pinion; setting up, on the basis of the virtual gear, a virtual inner gear which has the same number of teeth as the virtual gear, said teeth being on the inside; and setting up, on the basis of the virtual inner gear, a screw-shaped grindstone having various elements that are used for cutting the virtual inner gear.

1 Claim, 6 Drawing Sheets

(56) References Cited

U.S. PATENT DOCUMENTS

| | | | | |
|---|---|---|---|---|
| 2,119,295 | A * | 5/1938 | Schicht | 409/17 |
| 2,711,673 | A * | 6/1955 | Miller | 409/12 |
| 2,830,834 | A * | 4/1958 | Wildhaber | 403/364 |
| 3,091,059 | A * | 5/1963 | Cleff | 451/120 |
| 3,786,601 | A * | 1/1974 | Seidensticker | 451/283 |
| 4,475,319 | A * | 10/1984 | Wirz | 451/5 |
| 5,494,475 | A * | 2/1996 | Basstein et al. | 451/47 |
| 5,622,459 | A | 4/1997 | Basstein et al. | |
| 5,720,584 | A | 2/1998 | Sijtstra | |
| 5,823,857 | A * | 10/1998 | Tan | 451/47 |
| 6,347,980 | B1 * | 2/2002 | Kamamura et al. | 451/47 |
| 6,491,568 | B1 * | 12/2002 | Jankowski | 451/5 |
| 7,627,390 | B2 * | 12/2009 | Mueller et al. | 700/97 |
| 7,698,816 | B2 * | 4/2010 | Tan | 29/893.35 |
| 7,974,730 | B2 * | 7/2011 | Durr | 700/164 |
| 2002/0119737 | A1 * | 8/2002 | Tan | 451/47 |
| 2004/0029497 | A1 * | 2/2004 | Baeumler | 451/49 |
| 2007/0275640 | A1 * | 11/2007 | Iwano | 451/47 |
| 2008/0268750 | A1 * | 10/2008 | Fisher et al. | 451/5 |
| 2009/0036031 | A1 * | 2/2009 | Dongyun et al. | 451/36 |
| 2010/0210198 | A1 | 8/2010 | Yanase et al. | |
| 2010/0233947 | A1 * | 9/2010 | Kume et al. | 451/471 |
| 2010/0273400 | A1 * | 10/2010 | Schaeferling et al. | 451/47 |
| 2013/0122787 | A1 * | 5/2013 | Zarebski | 451/47 |
| 2014/0199921 | A1 * | 7/2014 | Yanase et al. | 451/56 |

FOREIGN PATENT DOCUMENTS

| | | | |
|---|---|---|---|
| JP | 6-504729 | A | 6/1994 |
| JP | 8-506768 | A | 7/1996 |
| JP | 9-500581 | A | 1/1997 |
| JP | 10-502301 | A | 3/1998 |
| JP | 2002-11615 | A | 1/2002 |
| JP | 3637357 | B2 | 1/2005 |
| JP | 3665874 | B2 | 4/2005 |
| JP | 2009-45681 | A | 3/2009 |
| JP | 2009-142939 | A | 7/2009 |
| JP | 2010-142927 | A | 7/2010 |
| NL | 8901745 | A | 2/1991 |
| WO | WO 92/09395 | A1 | 11/1992 |
| WO | WO 94/17945 | A1 | 8/1994 |
| WO | WO 94/26452 | A1 | 11/1994 |
| WO | WO 96/00635 | A1 | 1/1996 |
| WO | WO 2009/078193 | A1 | 6/2009 |
| WO | WO 2011/017301 | A1 | 2/2011 |

OTHER PUBLICATIONS

International Search Report and Written Opinion of the International Searching Authority with English translation.

Chinese Office Action for Chinese Application No. 201280025377.1, dated Feb. 4, 2015, along with an English translation.

* cited by examiner

METHOD FOR MANUFACTURING SCREW-SHAPED TOOL

TECHNICAL FIELD

The present invention relates to a method for manufacturing a threaded tool for use in grinding the tooth surfaces of a face gear.

BACKGROUND ART

Gears are frequently used in automotive transmissions and the like. In recent years, there has been a demand for improvement in gear machining accuracy for the purpose of reducing the vibrations and noises of transmissions. Generally, gear machining involves performing gear cutting on a prescribed gear blank to form a tooth profile, performing heat treatment on the gear after the gear cutting, and then performing finishing (grinding) to remove strain and the like resulting from the heat treatment. Usually, each tooth surface of a machining-target gear is ground by bringing the machining-target gear after its heat treatment and a grinding wheel into mesh with each other at a crossed axes angle. As tools to be used in such grinding methods, there are tools of various shapes such as externally toothed shapes, internally toothed shapes, and threaded (worm) shapes for the shapes of gears to be ground.

PRIOR ART DOCUMENT

Patent Documents

Patent Document 1: Japanese Patent No. 3637357 (see [FIG. 1], etc., for example)
Patent Document 2: Japanese Patent No. 3665874 (see [FIG. 7], [FIG. 17], etc., for example)

Non-Patent Document

Non-Patent Document 1: Hiroshi Gunbara, Kazumasa Kawasaki, "Geometrical Design of Point-Contact Face Gear", Transactions of the Japan Society of Mechanical Engineers, Part C, Volume 74, Issue 745, No. 08-0151, p. 197-201

SUMMARY OF THE INVENTION

Problem to be Solved by the Invention

In recent years, there has been a demand for further improvement in machining accuracy not only for external gears but also for face gears (see Non-Patent Document 1, for example). In this respect, as a tool for use in grinding a machining-target face gear, use of a threaded grinding wheel has been considered, the threaded grinding wheel being formed in such a way as to decrease gradually in diameter from the center of the grinding wheel in the direction of the rotation axis thereof toward either end in the axial direction thereof (see Patent Documents 1 and 2 listed above, for example).

There is, however, no consideration in either Patent Document 1 or 2 for what specifications the threaded grinding wheel should have when it is used to finish (grind) a machining-target face fear. In other words, there has been no consideration for a method for manufacturing a threaded grinding wheel which can grind a machining-target face gear accurately.

Thus, the present invention has been made to solve the above-mentioned problem, and an object thereof is to provide a method for manufacturing a threaded tool which can manufacture a threaded tool capable of grinding a face gear accurately.

Means for Solving the Problem

A method for manufacturing a threaded tool according to a first invention for solving the above-mentioned problem is a method for manufacturing a threaded tool which is to be formed in such a way as to increase gradually in diameter from axial ends thereof toward an axial center thereof, for use in gear machining of a machining-target face gear, characterized in that the method comprises:

based on a prescribed pinion which meshes with the machining-target face gear, setting a virtual gear which meshes with the prescribed pinion and has a greater number of teeth than the number of teeth of the prescribed pinion;

based on the virtual gear, setting a virtual internal gear which is internally toothed with the same number of teeth as the number of teeth of the virtual gear; and based on the virtual internal gear, setting the threaded tool which has specifications for use in gear machining of the virtual internal gear.

Effect of the Invention

According to the present invention, it is possible to realize a method for manufacturing a threaded tool which can manufacture a threaded tool having specifications allowing accurate grinding of a machining-target face gear.

MODES FOR CARRYING OUT THE INVENTION

A mode for carrying out a method for manufacturing a threaded tool according to the present invention will be described below with reference to FIGS. 1 to 6.

Figure 6:
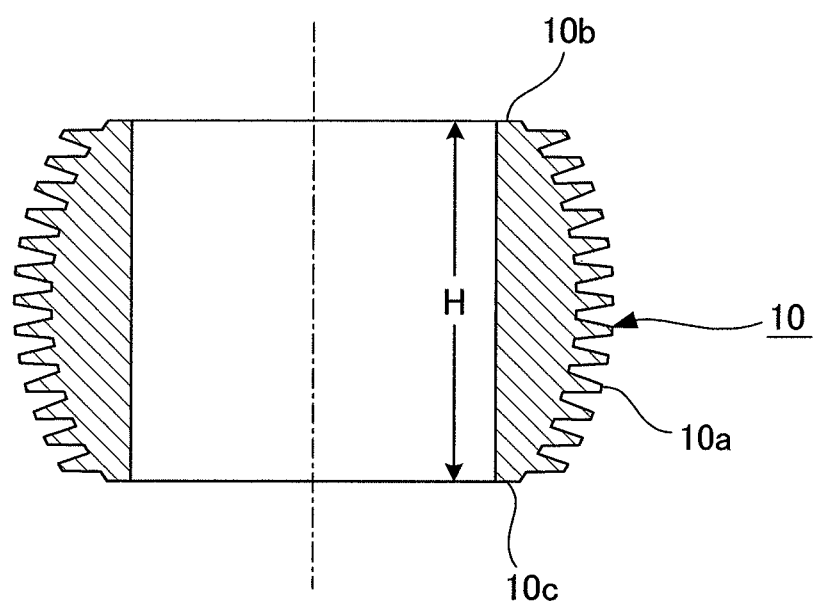
FIG. 6 is a vertical cross-sectional view of the threaded grinding wheel.

A threaded grinding wheel (threaded tool) to be manufactured by a method for manufacturing a threaded tool according to this embodiment is a tool for use in a grinding process in gear machining of a face gear. As shown in FIG. 6, a threaded grinding wheel 10 is formed in such a way as to increase gradually in diameter from its axial ends 10b and 10c toward its axial center. Edges 10a are formed at the peripheral surface of the threaded grinding wheel 10 in such a way as to extend from the end 10b on one side toward the end 10c on the other side while inclining with respect to the direction of the axis. The axial length of the threaded grinding wheel 10 (grinding-wheel length) is a length H.

Now, a method for manufacturing a threaded grinding wheel with the above configuration will be specifically described with reference to FIGS. 1 to 5.

Figure 1A:
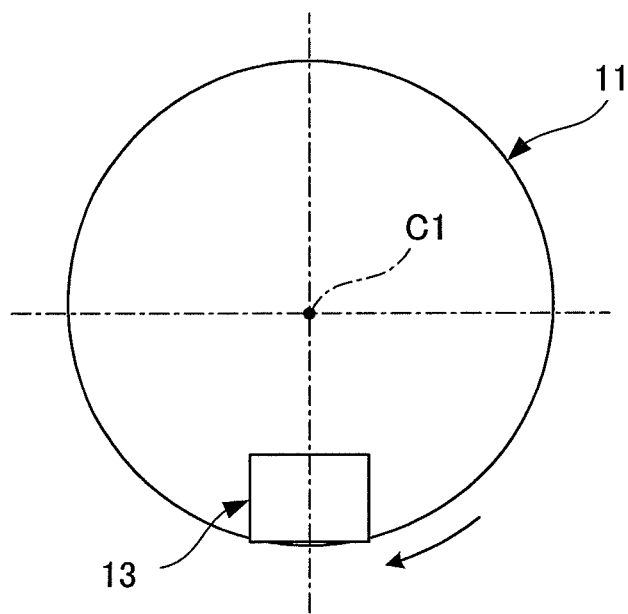
FIG. 1 is a set of views for describing a method for manufacturing a threaded grinding wheel according to an embodiment of the present invention, Part (a) of FIG. 1 showing a plan view of a state where a pinion which meshes with a machining-target face gear is disposed, Part (b) of FIG. 1 showing a side view of the state.
Figure 1B:
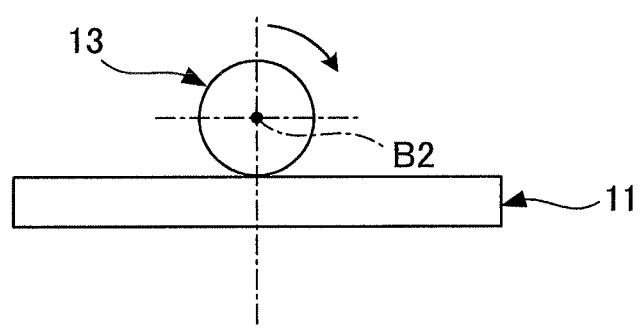

As shown in Parts (a) and (b) of FIG. 1, there is a prescribed pinion (e.g. a spur gear or a helical gear) 13 which meshes with a machining-target face gear 11 to be ground. That is, there is a prescribed pinion 13 which is rotated about a pinion rotation axis B2 by bringing the pinion 13 into mesh with teeth of the machining-target face gear 11 and rotating the machining-target face gear 11 about a workpiece rotation axis C1.

Figure 2A:
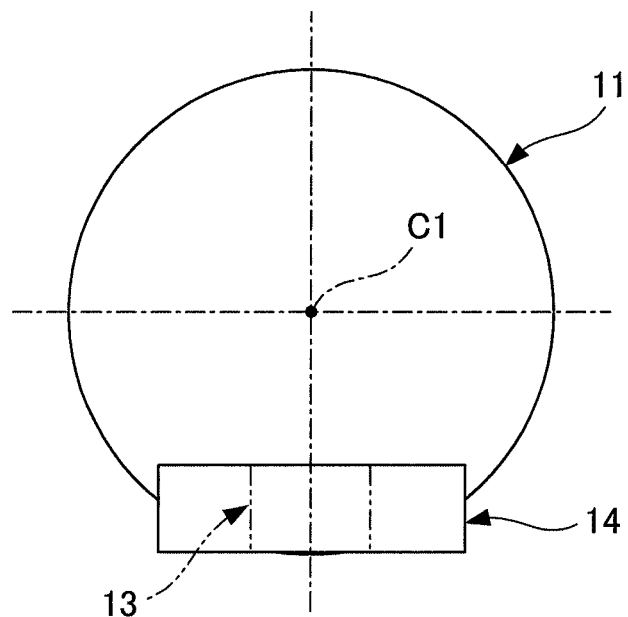
FIG. 2 is a set of views for describing the method for manufacturing a threaded grinding wheel according to the embodiment of the present invention, Part (a) of FIG. 2 showing a plan view of a state where a virtual gear which meshes with the pinion is disposed, Part (b) of FIG. 2 showing a side view of the state.
Figure 2B:
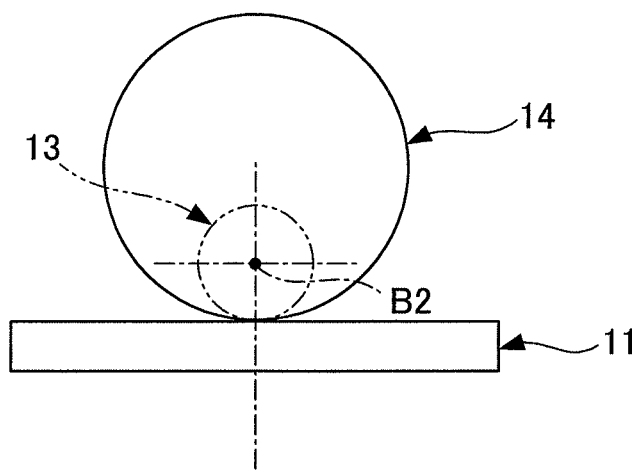

First, as shown in Parts (a) and (b) of FIG. 2, a virtual gear 14 is set which meshes with the prescribed pinion 13, has a greater number of teeth than the number of teeth of the pinion 13, and has the same specifications as the specifications of the pinion 13 except the number of teeth. The virtual gear 14 is a gear having an outline of the tooth profile, and may be an external gear, for example.

Figure 3A:
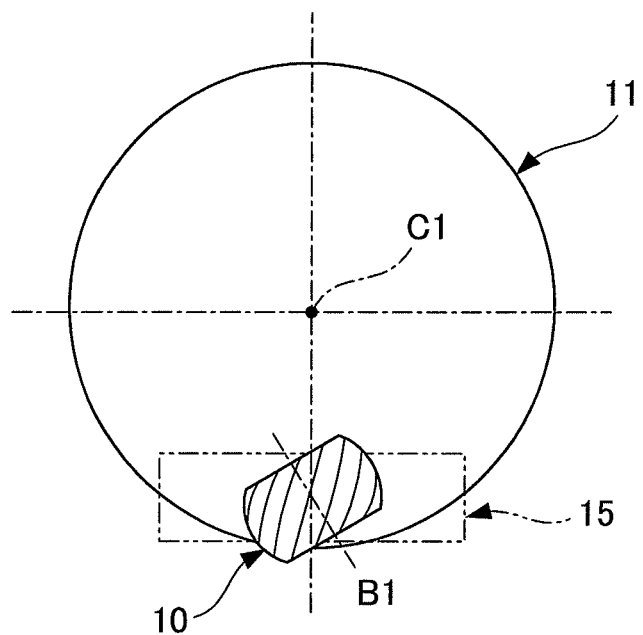
FIG. 3 is a set of views for describing the method for manufacturing a threaded grinding wheel according to the embodiment of the present invention, Part (a) of FIG. 3 showing a plan view of a state where a virtual gear is given as a virtual internal gear, and a threaded grinding wheel which meshes with the virtual internal gear is disposed, Part (b) of FIG. 3 showing a side view of the state.
Figure 3B:
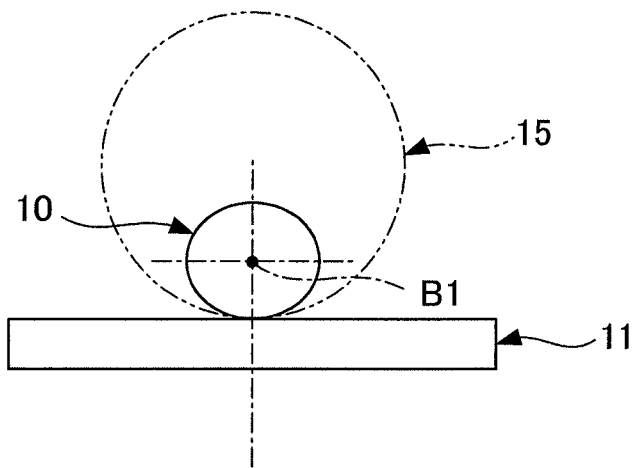
Figure 4A:
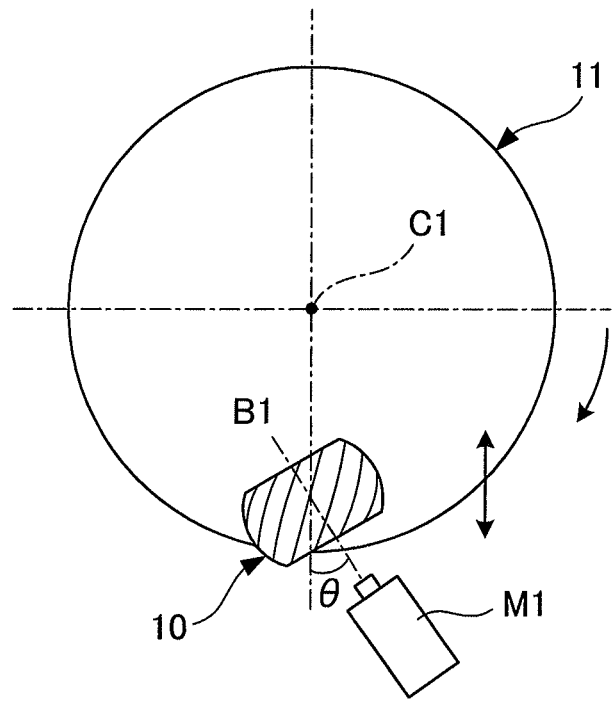
FIG. 4 is a set of views for describing grinding of the machining-target face gear using the threaded grinding wheel obtained by the method for manufacturing a threaded grinding wheel according to the embodiment of the present invention, Part (a) of FIG. 4 showing a plan view of a state where the threaded grinding wheel and the machining-target face gear are in mesh with each other, Part (b) of FIG. 4 showing a side view of the state.
Figure 4B:
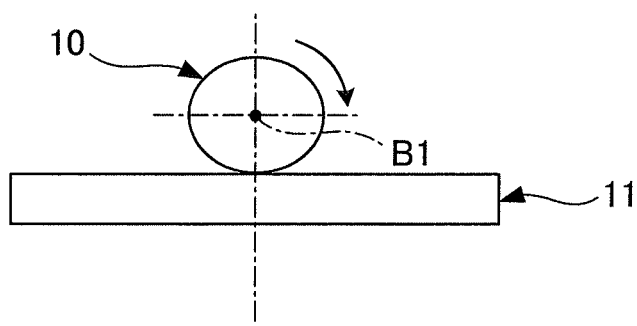

Then, based on the virtual gear 14, a virtual internal gear 15 (see Parts (a) and (b) of FIG. 3) is set which is internally toothed with the same number of teeth as the number of teeth of the virtual gear 14 and has the same specifications as the virtual gear 14.

Then, as shown in Parts (a) and (b) of FIG. 3, based on the virtual internal gear 15, a threaded grinding wheel 10 is set which has specifications for use in gear machining of the virtual internal gear 15. The threaded grinding wheel 10 for grinding the machining-target face gear 11 is formed in a barrel shape and has grinding-wheel specifications allowing proper mesh with the specifications of the machining-target face gear 11, and the edge profile thereof includes a predetermined helix angle. Since the threaded grinding wheel 10 meshes with the virtual internal gear 15, the threaded grinding wheel 10 meshes with the machining-target face gear 11 with the grinding-wheel rotation axis B1 being set at a predetermined crossed axes angle θ with respect to the workpiece rotation axis C1 of the machining-target face gear 11 as shown in Parts (a) and (b) of FIG. 4.

Figure 5:
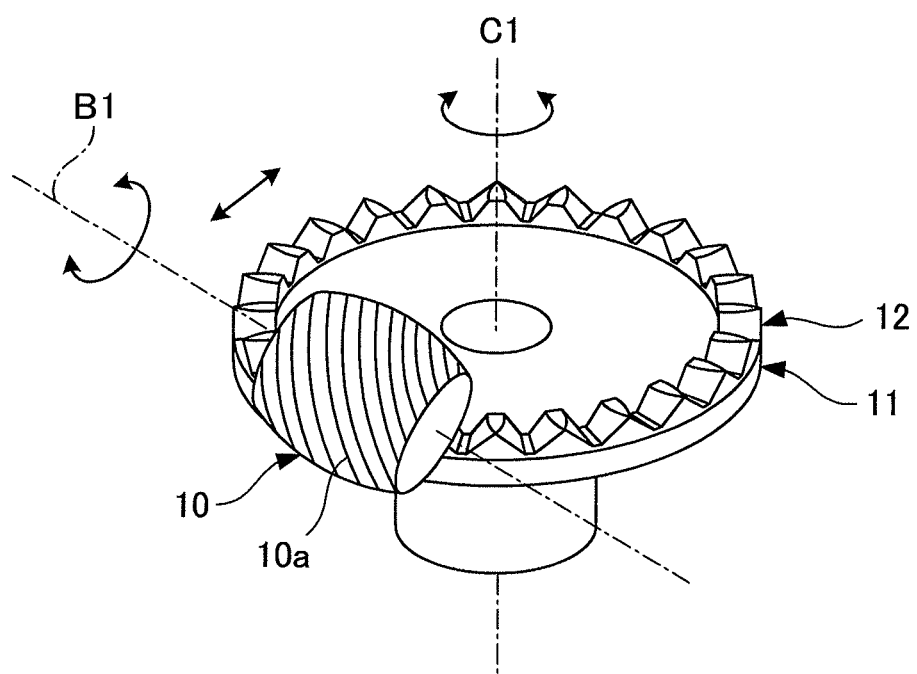
FIG. 5 is a view for describing a state where the machining-target face gear is ground by using the threaded grinding wheel obtained by the method for manufacturing a threaded grinding wheel according to the embodiment of the present invention.

Thus, in the case of grinding each tooth surface (tooth 12) of the machining-target face gear 11 by using the threaded grinding wheel 10 manufactured through the above-described steps, teeth 12 of the machining-target face gear 11 and edges 10a of the threaded grinding wheel 10 are brought into mesh with each other as shown in FIG. 5. In the meshing state, the machining-target face gear 11 is rotated about the workpiece rotation axis C1, while the threaded grinding wheel 10 is synchronously rotated about the grinding-wheel rotation axis B1 and also the threaded grinding wheel 10 is swung in the radial direction of the machining-target face gear 11. As a result, so-called crowning is performed in which each tooth 12 of the machining-target face gear 11 is machined by the edges 10a of the threaded grinding wheel 10 to have a slightly curved surface that makes the tooth 12 wider at the center and thinner at either end along its tooth trace. By using the threaded grinding wheel 10 manufactured through the steps described above, the tooth surface of the machining-target face gear 11 can be ground accurately.

As described above, the method for manufacturing a threaded tool according to this embodiment includes: based on a prescribed pinion 13 which meshes with a machining-target face gear 11, setting a virtual gear 14 which meshes with the prescribed pinion 13 and has a greater number of teeth than the number of teeth of the prescribed pinion 13; based on the virtual gear 14, setting a virtual internal gear 15 which is internally toothed with the same number of teeth as the number of teeth of the virtual gear 14; and based on the virtual internal gear 15, setting a threaded grinding wheel 15 which has specifications for use in gear machining of the virtual internal gear 15. Thus, a threaded grinding wheel 10 which meshes with the machining-target face gear 11 can be manufactured. Specifically, since the virtual gear 14 is set in such a way as to mesh with the prescribed pinion 13 and have a greater number of teeth than the number of teeth of the prescribed pinion 13, it is possible to manufacture a threaded grinding wheel 10 which meshes with the machining-target face gear 11 and has edges 10a that, in the meshing state, come into point contact with teeth 12 of the machining-target face gear 11 instead of line contact therewith, i.e. a threaded grinding wheel 10 which can grind the machining-target face gear 11 accurately. Moreover, the machining-target face gear 11 can be ground with the grinding-wheel rotation axis B1 of the threaded grinding wheel 10 being oriented at the predetermined crossed axes angle θ with respect to the workpiece rotation axis C1. Thus, the grinding speed can be increased, thereby making it possible to improve the sharpness of grinding action of the threaded grinding wheel 10 and increase the life thereof.

Note that although a method for manufacturing a threaded grinding wheel has been described hereinabove, a threaded grinding wheel obtained by the above-described method for manufacturing a threaded grinding wheel may be dressed by using the same method as a method for dressing a threaded grinding wheel for machining an internal gear (e.g. by using a dressing gear, a disk dresser, or the like). In this way, it is possible to recover the sharp tooth surfaces.

INDUSTRIAL APPLICABILITY

The present invention is a method for manufacturing a threaded tool and can manufacture a threaded tool which has specifications allowing accurate grinding of a machining-target face gear. Thus, the present invention is usefully applicable to machine tool industries and the like.

EXPLANATION OF THE REFERENCE NUMERALS threaded grinding wheel (threaded tool)
10 machining-target face gear
11 tooth
13 pinion
14 virtual gear
15 virtual internal gear
M1 grinding-wheel rotation drive source B1 grinding-wheel rotation axis
B2 pinion rotation axis
C1 workpiece rotation axis

The invention claimed is:

1. A method of setting a specification of a threaded tool which meshes with a machining-target face gear to be machined by the threaded tool, the threaded tool being formed in such a way as to increase gradually in diameter from axial ends thereof toward an axial center thereof, the method comprising:
   based on a prescribed pinion which meshes with the machining-target face gear, setting a first gear which meshes with the prescribed pinion and has a greater number of teeth than the number of teeth of the prescribed pinion;
   based on the first gear, setting a second gear which is internally toothed with the same number of teeth as the number of teeth of the first gear; and
   based on the second gear, setting the specification of the threaded tool for use in gear machining of the machining-target face gear gear.

* * * * *